United States Patent
Jones, Jr. et al.

(10) Patent No.: US 9,159,210 B2
(45) Date of Patent: Oct. 13, 2015

(54) METHOD AND SYSTEM FOR MONITORING OF FRIEND AND FOE IN A SECURITY INCIDENT

(71) Applicant: NetTalon Security Systems, Inc., Fredericksburg, VA (US)

(72) Inventors: Donald R Jones, Jr., New Canton, VA (US); Hussein Mohammed Nosair, Woodbridge, VA (US); Ronald Dubois, Dumfries, VA (US)

(73) Assignee: Nettalon Security Systems, Inc., Fredericksburg, VA (US)

( * ) Notice: Subject to any disclaimer, the term of this patent is extended or adjusted under 35 U.S.C. 154(b) by 482 days.

(21) Appl. No.: 13/682,959

(22) Filed: Nov. 21, 2012

(65) Prior Publication Data

US 2014/0139681 A1    May 22, 2014

(51) Int. Cl.
*G08B 13/196* (2006.01)
*G08B 25/14* (2006.01)

(52) U.S. Cl.
CPC .... *G08B 13/19645* (2013.01); *G08B 13/19682* (2013.01); *G08B 13/19695* (2013.01); *G08B 25/14* (2013.01)

(58) Field of Classification Search
CPC ....................................................... G08B 25/14
USPC .................. 348/143–159; 340/506, 511, 525, 340/539.16, 541
See application file for complete search history.

(56) References Cited

U.S. PATENT DOCUMENTS

| | | | |
|---|---|---|---|
| 5,223,816 A * | 6/1993 | Levinson et al. | 340/539.13 |
| 6,229,429 B1 * | 5/2001 | Horon | 340/286.01 |
| 6,281,790 B1 | 8/2001 | Kimmel et al. | |
| 6,838,992 B2 * | 1/2005 | Tenarvitz | 340/573.1 |
| 6,882,307 B1 * | 4/2005 | Gifford | 342/357.25 |
| 6,917,288 B2 | 7/2005 | Kimmel et al. | |
| 6,972,676 B1 | 12/2005 | Kimmel et al. | |
| 7,429,921 B2 * | 9/2008 | Seeley et al. | 340/539.2 |
| 7,986,228 B2 * | 7/2011 | Friar et al. | 340/539.16 |
| 8,350,698 B2 * | 1/2013 | Richman | 340/541 |
| 8,493,202 B1 * | 7/2013 | Trundle et al. | 340/502 |
| 8,760,520 B2 * | 6/2014 | Levin et al. | 348/169 |

(Continued)

FOREIGN PATENT DOCUMENTS

GB    2325548    11/1998

OTHER PUBLICATIONS

Office Action in U.S. Appl. No. 13/313,512 mailed May 22, 2014; 22 pages.

*Primary Examiner* — Paulos M Natnael
(74) *Attorney, Agent, or Firm* — Thomas, Karceski & Karmilovich, P.C.

(57) ABSTRACT

The present invention is directed to providing a method and system that enables a first responder security officer to take command and control of a building having a security incident. Using the method and system herein, the security officer is able to clearly distinguish the positions of his building entry teams in the building relative to the position of a suspect through a graphic display of friend and foe designation whereupon he can precisely direct a maneuver to close with the suspect. A group of motion sensors are mounted throughout the building to monitor various hallways for movement and collocated RFID readers are interrogated by the security alarm panel software to provide the intelligence for the security alarm control panel to distinguish a police building entry team (Friend) from the suspect (Foe).

18 Claims, 13 Drawing Sheets

(56) References Cited

U.S. PATENT DOCUMENTS

| | | | |
|---|---|---|---|
| 2003/0062997 A1* | 4/2003 | Naidoo et al. | 340/531 |
| 2004/0150520 A1* | 8/2004 | Barrie | 340/539.13 |
| 2007/0008099 A1 | 1/2007 | Kimmel et al. | |
| 2007/0279210 A1* | 12/2007 | Li et al. | 340/506 |
| 2008/0122609 A1* | 5/2008 | Mannisto et al. | 340/500 |
| 2009/0018875 A1* | 1/2009 | Monatesti et al. | 705/7 |
| 2009/0079575 A1* | 3/2009 | Bouressa | 340/573.4 |
| 2010/0238019 A1* | 9/2010 | Richman et al. | 340/521 |
| 2010/0245083 A1* | 9/2010 | Lewis | 340/540 |

* cited by examiner

METHOD AND SYSTEM FOR MONITORING OF FRIEND AND FOE IN A SECURITY INCIDENT

The present invention is directed to a method and system for monitoring persons during an in-building security incident. Specifically, the current invention accurately identifies and tracks both friends and foes, and differentiates between them in the tracking mechanism.

BACKGROUND

In the most common example, persons who live, go to school or work in a building and who are immediately caught in a security incident such as an active shooter event are typically fleeing for their lives, while those outside the danger area in other parts of the building may not know for some time of the ongoing danger. There is usually no electronic alert system or automated voice system in a building to warn building occupants of a potential active shooter event as there may be for a building fire alarm. In public schools, for instance, the administration may make a loud speaker announcement if the school is under attack, and at colleges and universities, a campus wide alert system will be activated at a point when someone can make an emergency 911 call. Active shooter statistics show that alerts often occur about two or more minutes after an incident begins.

In the event of a tragedy, many people may be shot before a 911 call is received. Often, the 911 operator will try and get information about the shooter(s) and their location(s). There will be a number of 911 calls coming from the incident scene, but in the next 2-3 minutes police most likely will not have a suspect description, the number of shooter(s), or the location of the shooter(s). When police arrive on scene, they will form building entry teams and the senior officer on the scene will assume incident command and continue to be in communication with the 911 police dispatch officer for any information coming from individuals trapped in the building.

Once on site, building entry teams enter the building and move in different directions in search of the shooter(s) and the location(s) of victim(s) while simultaneously seeking useful on-site information. At this time, building entry teams generally do not have a subject description. Police often seek information from victims while assisting those victims to safety. Once they finally pinpoint a last location and possibly a description of the shooter(s), police continue searching the building. They listen for gunfire to alert them of the shooter's general location. The building entry teams generally do not have any knowledge of the interior building space other than their building reference system of A side (street side), then clockwise B side, C side and D side of the building. Building entry teams only have their radios to try and coordinate their location and movement. Unless they can orient on gunfire, they do not know where the shooter(s) are or if they are still in the building. The incident commander has little if any ability for a proactive command as he is dependent on the building entry teams for real-time intelligence. He may or may not have building floor plans to familiarize himself with the building or to plot the locations of his teams in the building. All law enforcement understands the quicker they can close with the shooter the quicker they will stop the killing. Unfortunately, in today's environment a suspect's movement in the building is a time consuming extensive search for the suspect(s) unless the team happens to luck out through gunfire echoes and receipt of timely intelligence from victims calling for help on a cell phone. In such an environment, where an active shooter is not contained and multiple police teams are in the building, command and control is difficult and friendly fire is always a concern as all fingers are on triggers.

SUMMARY

The present invention is directed to providing systems and methods for locally and remotely monitoring building sites to provide real-time information that can readily distinguish false alarms from real ones and that can identify and track the location of an alarm and/or its cause with substantial precision. In exemplary embodiments, active shooter notification capabilities can be implemented through the use of emergency activation transmitters that permit information to be transmitted using standard network protocols from a remote site to a monitoring station in real-time over preexisting communication network transmission pathways (e.g. wire, fiber optic, wireless and satellite). Communications can thereby be established between a centrally located host monitoring station and a separate security alarm panel deployed in each of the buildings to be remotely monitored. Using this active shooter notification information, an operator at a first responder/security officer monitoring station is able to identify through electronic intelligence that an active shooter incident is underway and is able to gain a subject description and precise subject location using the same communication network transmission pathway or pathways. In this way the first responder/security officer monitoring station operator can track a suspect in real-time and report the current suspect location to en-route units.

The term "security alarm panel," as used in this specification, includes a wide variety of security/fire panels that are in communication with security sensors, video cameras and, optionally motion detectors that are capable of providing simultaneous information to multiple monitoring systems. "Security alarm panels" may include, but are not limited to, panels for monitoring an alert to a shooting incident, the location of the shooting incident through multi state security motion detectors, subject and weapons description through remote access video intelligence, safe havens that are currently under attack through electronic signaling station activation and shooter movement and current location in time through initial lock on and subsequent tracking through motion detectors, video surveillance and RFID friend/foe tracking.

In exemplary embodiments, communications can be transmitted from a centrally located host monitoring system able to display the security alarm panel to a mobile monitoring station for example, to a laptop computer in a responding vehicle, such as a security officer vehicle able to display the same information. The transmission can be such that direct communications are established between a security alarm panel located at a site being monitored and a mobile monitoring station (for example, via communication with a laptop over a wireless network). Alternatively or in addition, indirect communications can be established via a host monitoring station.

Embodiments of the present invention can provide primary visual alarm status reporting that gives a monitoring authority the ability to identify the precise location of a shooter, and to distinguish false alarms from real ones. Multiple state, or multistate, indications are provided to represent a sensor. For example, in various embodiments, each sensor may be identified as being: (1) currently in alarm; (2) currently in alarm and acknowledged by a monitor; (3) recently in alarm; (4) not in alarm; (5) disabled; or (6) non-reporting. These embodiments are integrated with RFID technology so law enforcement building entry teams equipped with an RFID tag can be identified as Friend(s) and moving suspects can be distinguished as Foe(s). With these multistate indications, the movements of a shooter can be tracked relative to the positions of law enforcement building entry teams, and yet the location of the shooter can still be identified with a great deal of precision. This additional tracking ability gives law enforcement officers a tactical advantage at the scene as they know the location of the shooter and can track any subsequent movements as they close in order to end the incident. This precise information will tell an incident commander how to maneuver his teams to best close with the shooter(s).

Exemplary embodiments of the present invention are directed to a method and apparatus for monitoring a space. A security alarm panel is operatively linked with a plurality of sensors. It includes a graphic interface to display information as multistate outputs associated with each of the plurality of sensors. Also, the security alarm panel is often referenced in this application as being located at the space or building. While the physical location of a physical panel can be within the confines of the space or building, the security panel may also exist remotely in terms of data and information in off-site servers. These off-site servers may also receive and process and present the on-site sensor information and display parameters.

BRIEF DESCRIPTION OF THE DRAWINGS

In FIG. 2, all sensors are inactive to allow occupants to freely roam through the building.

DETAILED DESCRIPTION

Figure 1:
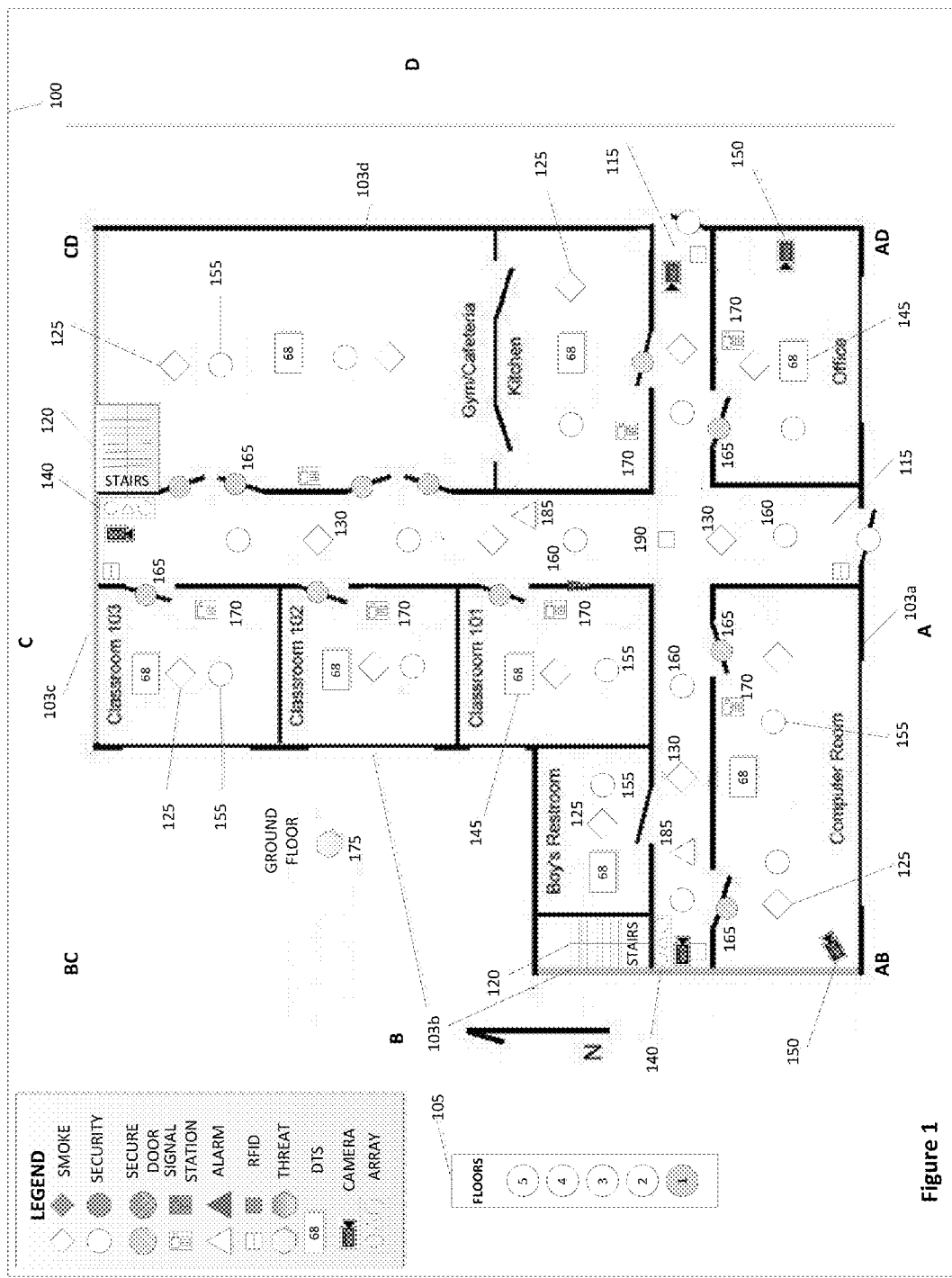
FIG. 1 shows an exemplary graphics screen viewed through a security alarm panel screen, wherein the graphic display contains a floor plan layout of the ground floor (level 1) of a school building, with special icons overlaid on a map to identify security and fire sensor points and their status, video cameras, signaling alarms, RFID sensors, individual signaling stations and evacuation signal arrays and their status. The Legend illustrates the active/inactive states of various sensors and devices.

The current method and apparatus maybe implemented together with or partially with the method and apparatus disclosed in earlier U.S. Pat. No. 6,821,790 issued Aug. 28, 2001; U.S. Pat. No. 6,917,288 issued Jul. 15, 2005; and U.S. Pat. No. 6,972,676 issued Dec. 12, 2005; and U.S. application Ser. No. 13/313,512, filed Dec. 7, 2011, and Ser. No. 13/534,582, filed Jun. 27, 2012; which are incorporated herein by reference in their entirety.

The present method and system provide the tools for a first responder, in this case a security officer, to monitor and have precise command and control in order to maneuver building entry teams to close with a suspect through a system and method of Friend/Foe recognition. The discussion that follows often references a single building that is being monitored and that is able to be managed by a first responder. The method and system is able to be deployed in two or more buildings equally efficiently.

In each building, a plurality of security sensors, video cameras and motion detectors are installed in hallways, common spaces and occupied space such as offices, conference rooms, hotel rooms, etc. The devices provide electronic intelligence as to the probable position of a suspect, and video surveillance is used to confirm suspect identification. A security alarm panel is operatively linked to the sensors, cameras and detectors, and it is further linked to first responder security officer computers. When a security sensor is activated by receiving a signal from an emergency activation transmitter, an alarm is sent to a security officer such as, typically, a 911 police dispatcher, police district station and to police HQ. The operators/officers at these sites are then able to call up a building floor plan on a computer wherein the building is the site of the possible security incident such as an active shooter event.

The police officers manning emergency response stations are able to identify the probable location of a suspect through an array of sensors signaling real-time electronic intelligence and then confirming that intelligence through video surveillance. These same police operators then track the suspect through motion detectors and video surveillance so as to maintain contact with the suspect's location in the building. Security officers arriving on the scene form building entry teams with each team equipped with a tactical computer that wirelessly receives the same information as the security alarm panel and perhaps other fixed monitoring stations. The tactical computer is equipped with an active RFID tag. When the teams enter the building, they are detected by motion detectors that alarm. The security alarm panel receives the alarm state and queries the RFID receiver collocated with the motion detectors. If the receiver is reading, the security alarm panel colors the motion detector (blue) for friendly. When it is not reading, the security alarm panel colors the motion detector icon (yellow) for probable foe, i.e. the suspect(s).

Video surveillance provides verification and enables precise tracking. A security officer incident commander on his mobile data computer graphic display now sees the relative positions of his building entry teams (blue motion sensors) compared with that of the shooter(s) (yellow motion sensors) and directs precise maneuver for his teams to close with the shooter(s). As the building entry teams see the total tactical picture on their tablet computer graphic displays they can coordinate rapid, coordinated/controlled maneuvers to intercept the shooter(s). The maneuvers can take place with each building entry team fully cognizant of each respective team's position to reduce or eliminate the possibility of causalities from friendly fire.

Figure 10:
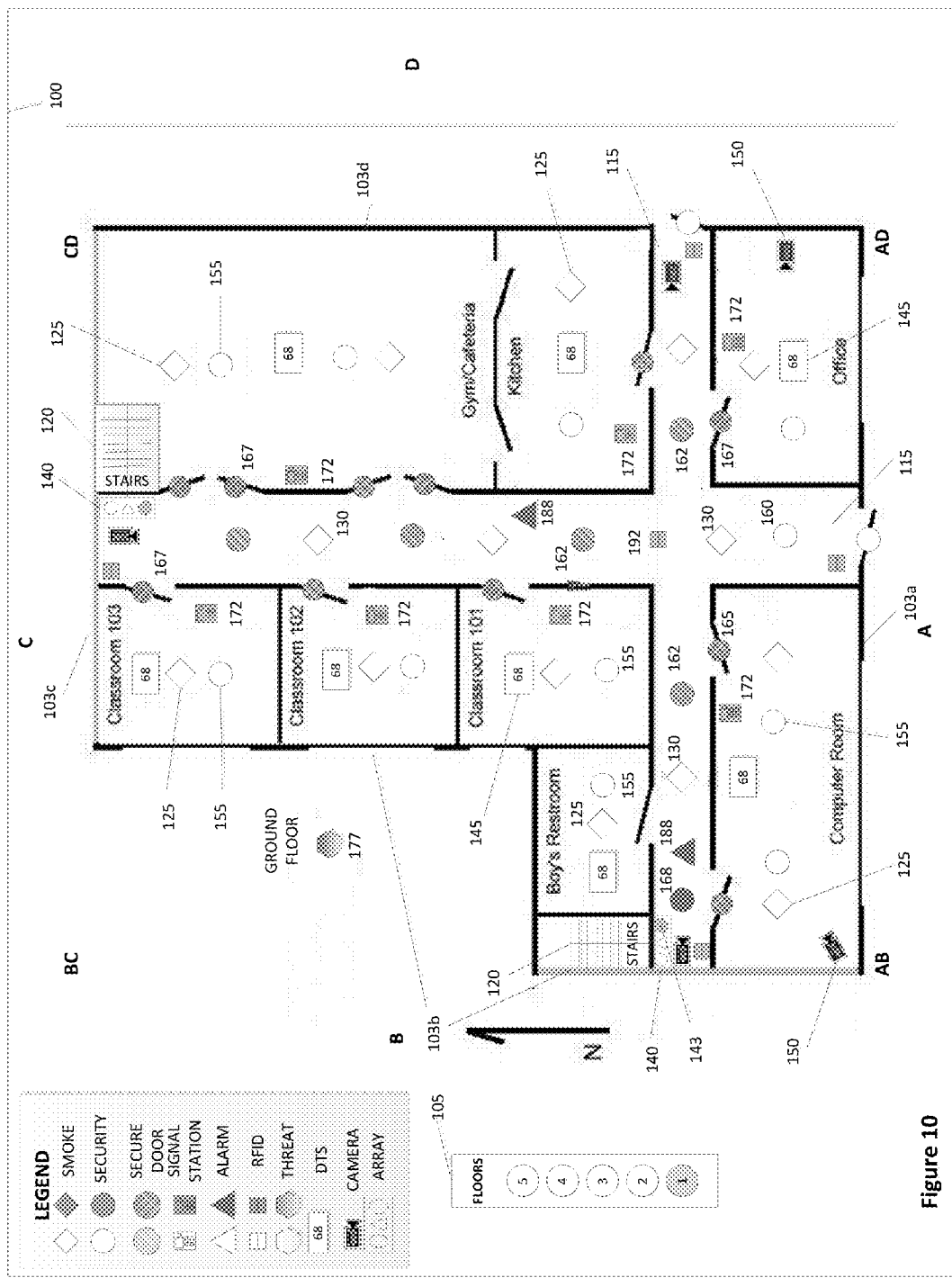
FIG. 10 shows an exemplary graphics screen for the ground floor (level 1) viewed through a security alarm panel screen and fixed and mobile monitoring screens during an active shooter incident.

A hypothetical, active shooter event timeline table in MM:SS (minutes:seconds) identifies the path the active shooters take through the building. The following paragraphs detail the hypothetical police and fire response using real-time information provided by the security alarm panel to all monitoring stations including Friend/Foe real-time identification and tracking. FIG. 10 corresponds to an active shooter incident timeline from 00:00 to 02:45 (MM:SS) while FIG. 11 corresponds to the active shooter incident timeline from 03:00 to 05:00 (MM:SS), the end of the attack.

Hypothetical Active Shooter Event Timeline

| Event Description | Time After Entry (MM:SS) |
|---|---|
| [FIG. 10] Shots fired. Two shooters enter school building using D side door. | 00:00 |
| [FIG. 10] One student is shot and severely wounded leaving ground floor Administration Office. | 00.05 |
| [FIG. 10] Administration Office staff immediately locks door and places school building in Active Shooter alarm using emergency key fob activation transmitter. Security alarm panel places school in Active Shooter Alert and directs students to designated safe rooms. All local and remote monitoring stations receive alarms within 3 seconds—alerting school security and local police dispatch of Active Shooter incident in progress. All IP cameras are opened for remote monitoring. | 00:15 |
| [FIG. 10] Classroom motion sensors disabled. Corridor motion sensors enabled. Officers at a Police Command & Control Center (C2) networked to school drill to location of Threat icon, look for active motion detectors, tap corresponding live videoand locate shooters. Two C2 work stations track shooters. Shooters continue entry into school corridors. One shooter moves into BD corridor, checking doors, and seeking targets. | 00:20 |
| [FIG. 10] Second shooter moves into AC corridor, checking doors, and seeking targets. | 00:25 |
| [FIG. 10] C2 provides responding officers suspect description, locations and weapons descriptions. | 00:40 |
| [FIG. 10] Shooters continue seeking targets by systematically checking class room doors. Students alerted have sought refuge in safe rooms with activated signaling stations that include emergency activation transmitters. Signaling station report safe room status information to all monitoring stations. Incident commander has ability to communicate with individual safe rooms using VOIP communications and IP video links in the signaling stations. Shooters attempt to enter safe rooms by shooting door locks. Hardened locks hold under shooters barrage. | 01:30 |
| [FIG. 10] Corridor motion sensors indicate path shooters take through building. Sensors recently in alarm (cross hatched) detail path while sensors in alarm (solid) identify current location of shooters. Corridor AC all previously in alarm indicative of shooter moving up AC stair well. | 02:15 |
| [FIG. 10] Signaling stations indicate all safe rooms as secure with no student injuries. Incident commander communicates instructions to each safe room signaling station. Incident commander controls safe room locks and keeps rooms in lockdown. | 02:45 |
| [FIG. 11] Police officers arrive on campus and form building entry teams (BET). Each team has a tactical computer to view shooters movement and that of other BET's. The tablets have activated RFID readers. Incident commander issues coordinating instructions and sends BETs into the building. Motion sensors in vicinity of BETs turn blue (Friend). Motion sensors not in vicinity of BETs turn yellow (Foe). BETs monitor real-time movement and determine shooters have moved to upper floor. | 03:00 |
| [FIG. 11] BETs sweep building. BET1 initially supports medical needs of initial victim then continues DB corridor. BET2 checks AC corridor. No suspect found. Ground floor under control of police (Friends). Level 2 indicates presence of shooters (Foes). Upper floor surveillance indicates upper floors (levels 3-5) reveals safe rooms locked and clear of foes. | 03:15 |
| [FIG. 11] Safe rooms on second floor under attack. Fire started by shooters in second floor bath room. Smoke alarms and increasing temperature displayed indicate source and spread of fire. Both suspects found in AC corridor attempting to break into class room 202. Police intercept shooter in AC corridor. Shootout ensues with one shooter down and second surrendering. Suspects in custody. | 04:00 |
| [FIG. 11] All floors checked, student released from safe rooms. Active Shooter incident over, with one victim. | 05:00 |

Figure 11:
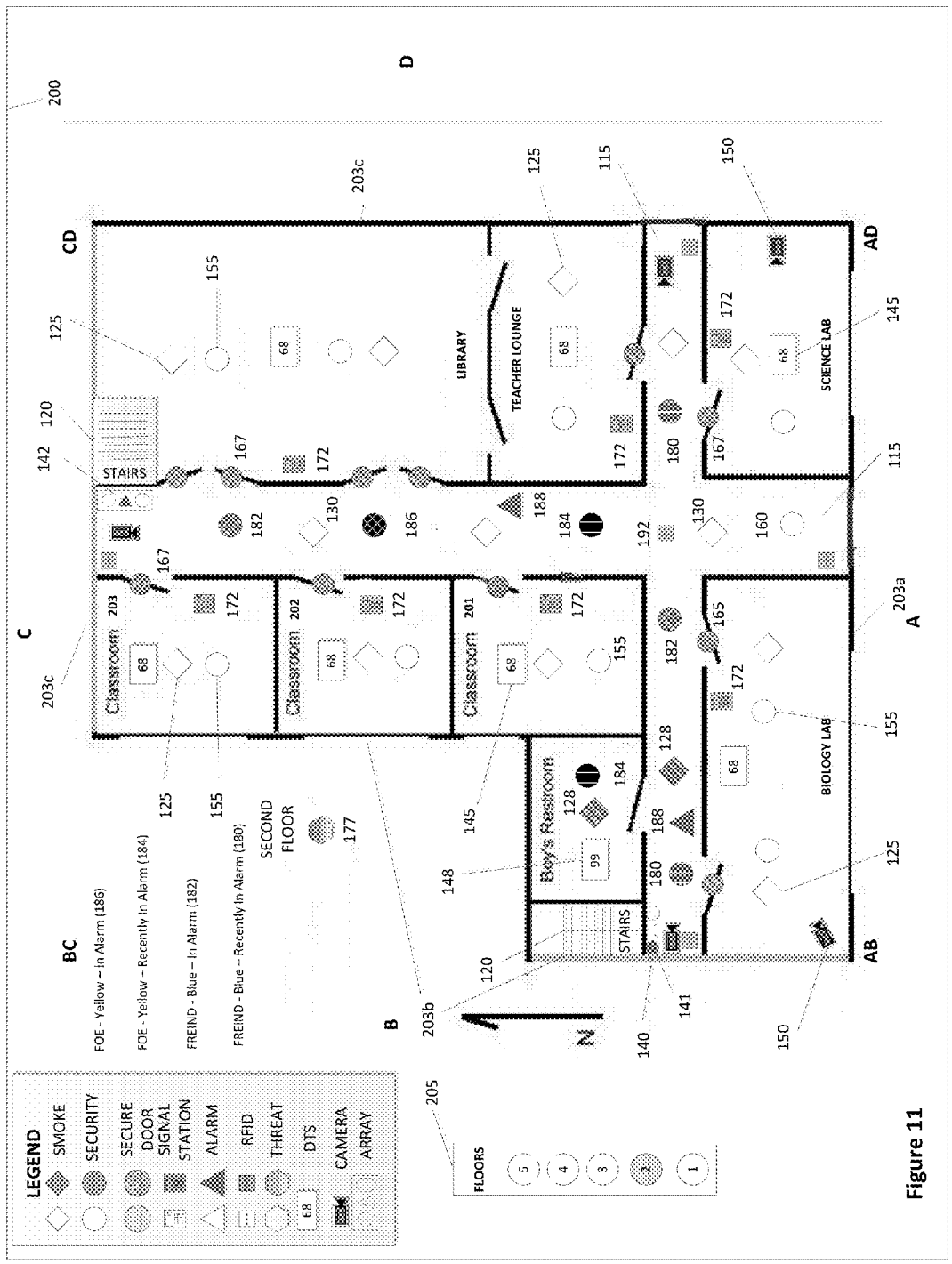
FIG. 11 shows an exemplary graphics screen for the second floor (level 2) viewed through a security alarm panel screen and fixed and mobile monitoring screens, during an active shooter incident.
Figure 12:
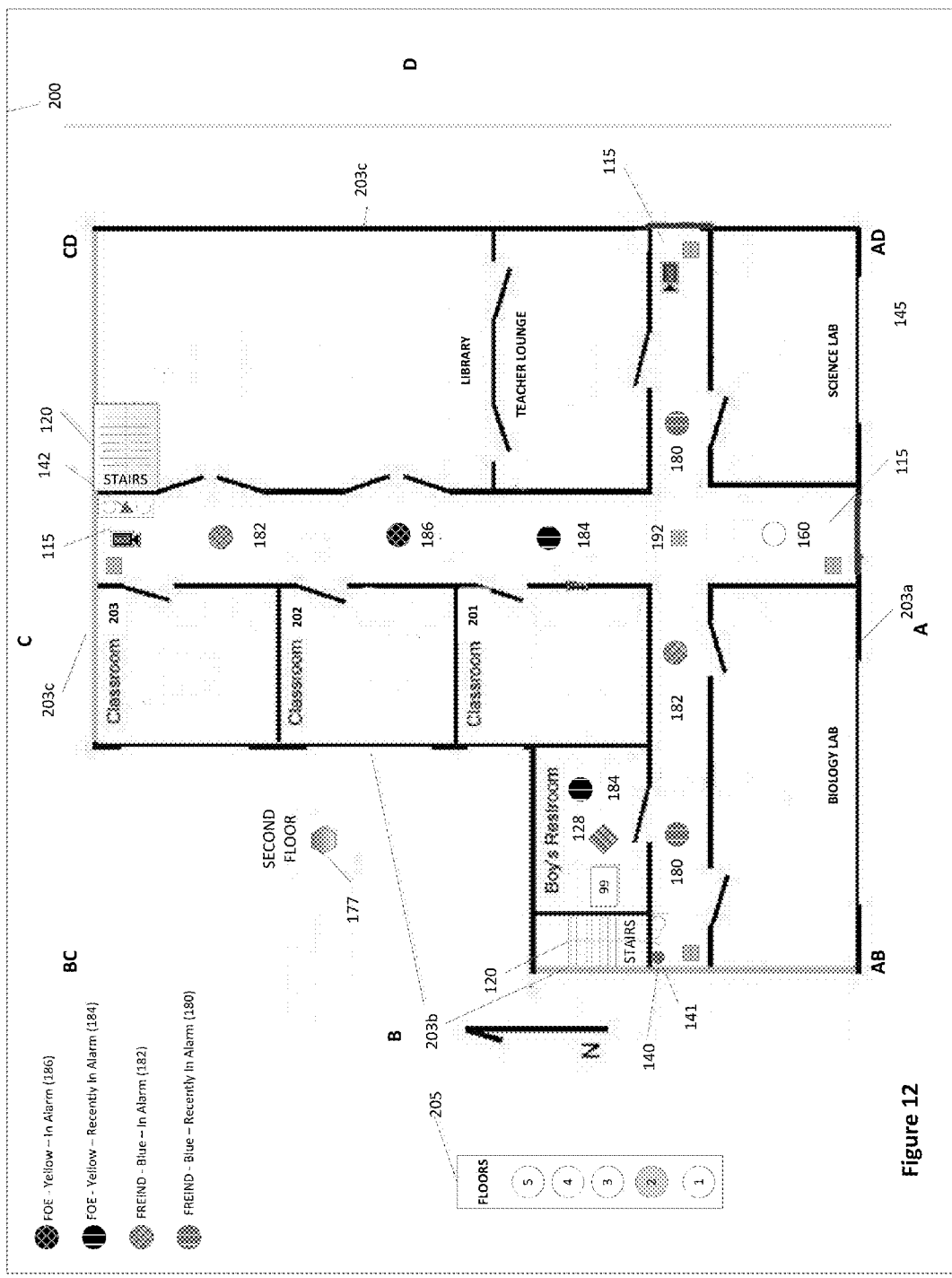
FIG. 12 is a simplified version of FIG. 11, removing icons or other indicia for all non-essential sensors to highlight the Friend/Foe capability of the monitoring system.

The present system and method are demonstrated in FIGS. 1-2 and FIGS. 10,11 and 12 which displays the building in a normal, inactive monitoring state (FIGS. 1-2), and in an active shooter, active alarm state (FIGS. 10,11 and 12).

FIG. 1 shows an example of a graphics screen from a security alarm panel containing a floor plan 100 for a multi-story school building. The inactive threat icon 175 is located near the Ground Floor label. The building has five floors as shown in the floor table 105. Table 105 has activated the circle with the "1" in it to indicate that floor plan 100 denotes the 1$^{st}$ floor (ground floor) of the five floor building. Floor plan 100 includes a building having four sides 103a-103d. Each of these sides 103a-103d has an indicator A, B, C and D to differentiate the sides of the building floor plan 100.

There are eight rooms shown in this floor plan 100. Three classrooms labeled 101, 102, and 103 are found west of the north-south AC corridor. Two hallways 115 are located along the north-south AC corridor and the east-west BD corridor. The security sensors, in this example, RFID readers 190 are located where the two corridors intersect and at the end of each corridor.

There is a large Gym/Cafeteria and Kitchen located along the north-south AC corridor across from classrooms 101, 102 and 103. Each room contains digital temperature sensors 145, smoke sensors 125, motion sensors 155 and signaling stations 170. The remaining rooms include a boys restroom, computer room and administration office as labeled along east-west hallway BD.

During an active shooter incident, all motion sensors 155 located in interior rooms are disabled while corridor motion sensors 160 remain enabled. Hardened doors 165 enable rooms to be locked down and secured during an active shooter incident. Secure IP cameras 150 are found in the hallways 115 and the office and computer rooms. All smoke sensors 125 located in individual rooms or hallways 130 remain active at all times. Stairs 120 and emergency evacuation signal arrays 140 are found at the east end BD hallway and the north end BC hallway. Aural signaling devices 185 are located in both the DB and AC corridors and are used to provide aural warning of a fire or active shooter event.

Figure 2:
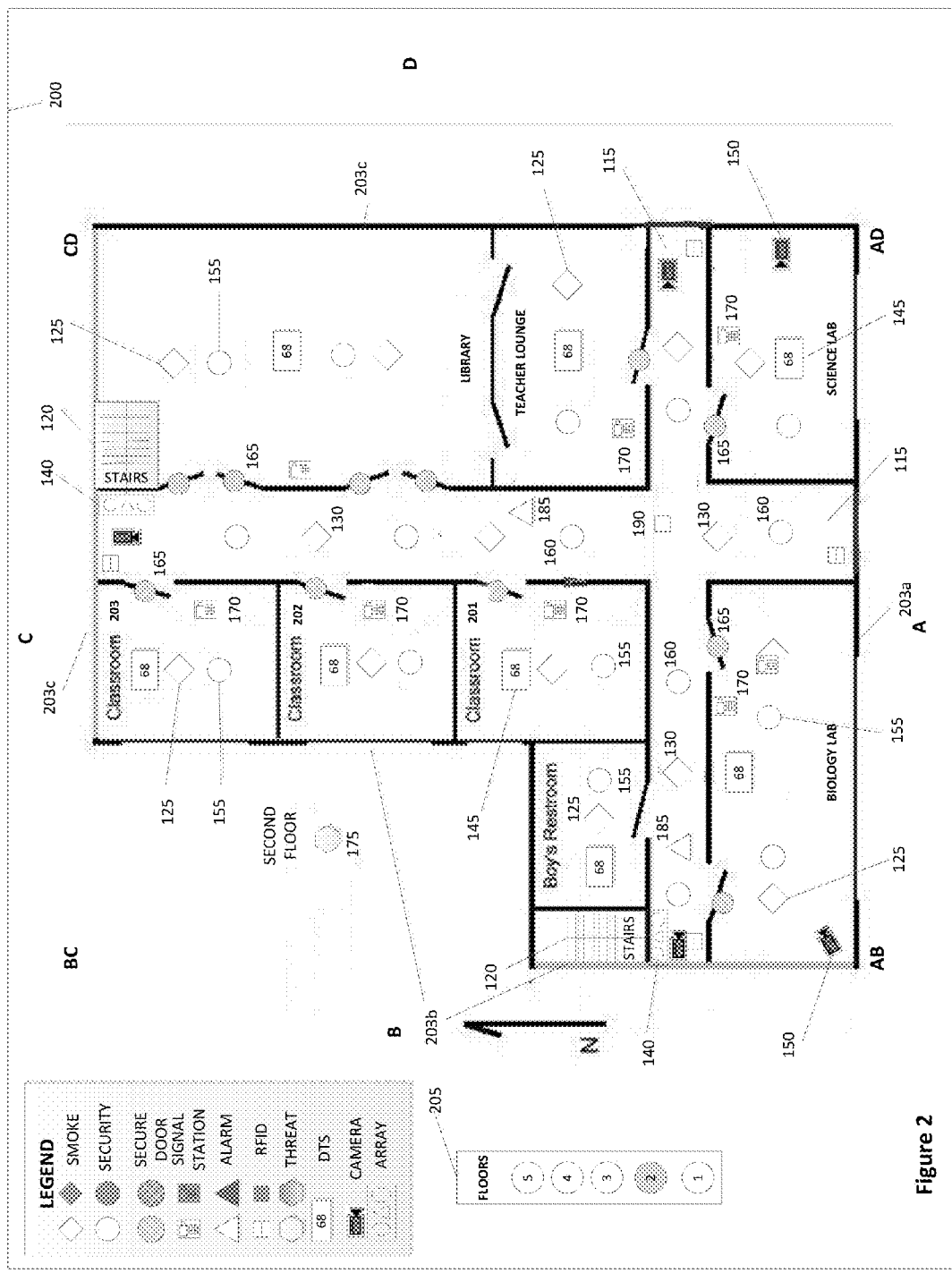
FIG. 2 shows an exemplary graphics screen viewed through a security alarm panel screen illustrating the second floor (level 2) of the school building, wherein the graphics display contains a floor plan layout, with special icons overlaid on the map similar to FIG. 1.

FIG. 2 shows another example graphic screen from a security alarm panel containing a 2$^{nd}$ floor plan 200 for a multi-story school building as in FIGS. 1, 2, 10, 11 and 12. The inactive threat icon 175 is located near second floor label. The building has five floors as shown in the Table 205. Table 205 has activated the circle with the "2" in it to indicate that this floor plan 200 denotes the 2$^{nd}$ floor of the five floor building. Floor plan 200 includes a building having four sides 203a-203d. Each of these sides 203a-203d has an indicator A, B, C and D to differentiate the sides of the building floor plan 200.

There are eight rooms shown in this floor plan 200. Three classrooms 201, 202, and 203 are found west of the north-south AC corridor. Two hallways 115 are located along the north-south AC corridor and the east-west BD corridor. The RFID readers 190 are located where the two corridors intersect and at the end of each corridor.

There is a library and teacher's lounge located along the AC corridor across from classrooms 201, 202 and 203. Each room contains digital temperature sensors 145, smoke sensors 125, motion sensors 155 and signaling stations 170. During an active shooter or other security incident, all motion sensors 155 located in interior rooms are disabled while corridor motion sensors 160 remain enabled. Hardened doors 165 enable rooms to become safe rooms which are locked down and secured during an active shooter incident. The remaining rooms include a restroom, biology and science laboratories along the east-west hallway BD.

Secure IP cameras 150 are found in the hallways 115 and the office and computer rooms. All smoke sensors 125 located in individual rooms or hallways 130 remain active at all times. Stairs 120 and emergency evacuation signal arrays 140 are found at the east end BD hallway and the north end AC hallway. Aural signaling devices 185 are located in both the DB and AC corridors.

Figure 13:
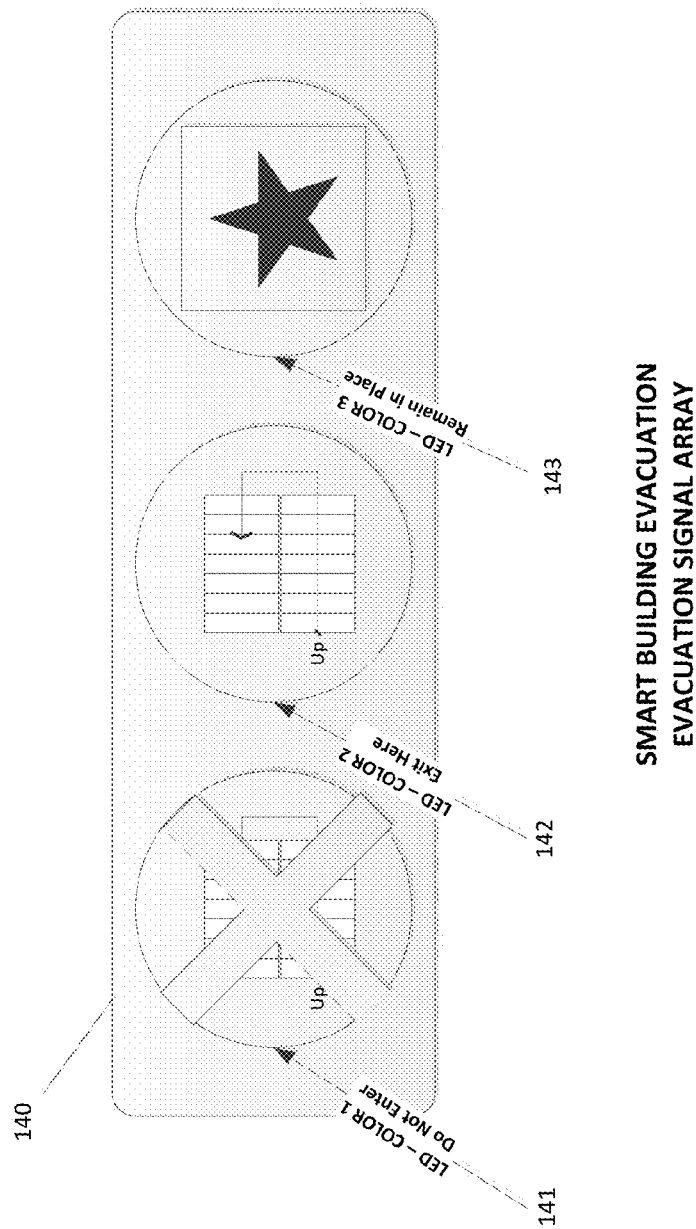
FIG. 13 is the Smart Building Evacuation Signal Array controlled virtually by an incident commander. The Evacuation Signal Array display instructions including Do Not Use (i.e. avoid stairs), Exit Here, and Remain in Place.

Positioned proximate each stairway 120 is an evacuation signal array 140. An example of each signal array 140 is shown as having three icons 141, 142 and 143 displayed thereon. The icons 141, 142 and 143 are shown separately in this floor plan 100. FIG. 13 graphically illustrates this example of the functional design of the signaling array. The actual signal array 140 may contain the multiple icons 141, 142 and 143 or, alternatively, may constitute a single display that may have the functionality to visually display different icons on a single screen. Finally, there is a temperature icon 145 in each room that sets forth the actual temperature. This temperature icon 145 may also be able to display other real-time temperature information like rate of rise alarm.

FIGS. 1 and 2 show all of the sensors and all of the signal arrays in the open and inactive state with the temperature icon in each room displaying a normal current room temperature (e.g. 68 degrees). The only icon that is activated are the floor 1 and 2 icons in tables 105 and 205. FIGS. 10 and 11 are similar to FIGS. 1 and 2 but contain real-time information received from the security alarm panel during a hypothetical active shooter incident. FIG. 10 represents real-time emergency information for the ground floor displayed on all monitoring screens starting at 00:00 to 02:45 (MM:SS), while FIG. 11 represents the real-time information displayed on all monitoring screens starting at 02:45 to 05:00 (MM:SS). FIG. 12 is a simplified graphic of FIG. 11 highlighting the icons (visual indicia) used to identify the Friends and Foes in the active shooter incident. In this case, the icons 186 and 184 precisely locate the suspect intruders (foes) while icons 180 and 182 precisely locate the police building entry teams (friends). This graphic also displays the start of a fire in the second floor restroom as indicated by the elevated temperature icon reading 99° F., the smoke alarm 128 in alarm and the yellow motion sensor recently in alarm 184 indicative of the foes previously in the restroom.

Figure 3:
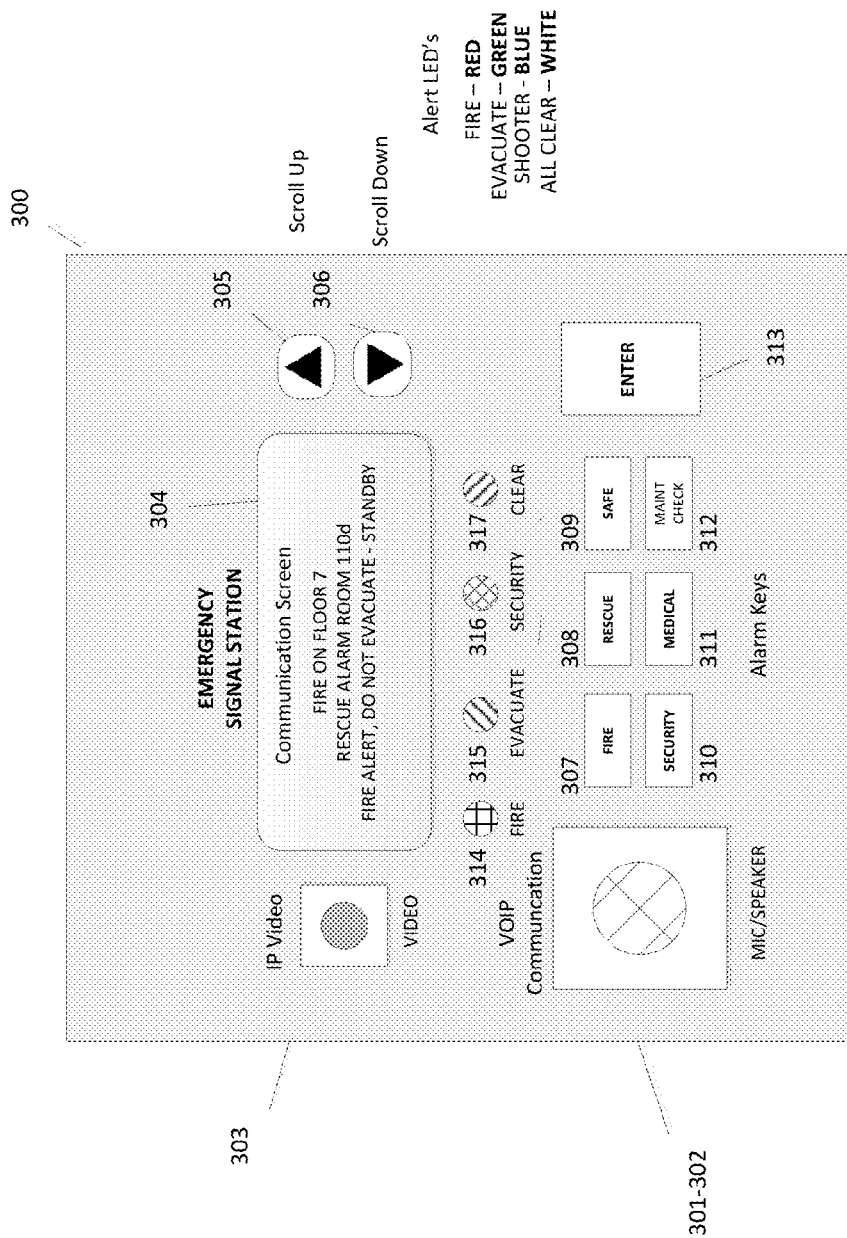
FIG. 3 illustrates an embodiment of an emergency signaling station with functionality indicated.

FIG. 3 represents an example of a functional design of an emergency signaling station 300. The device includes a microphone 301 and speaker 302 enabling an incident commander to communicate directly with individuals in the room. The device also includes an IP video camera 303 enabling visual verification of occupants in room. A multi-lined communication screen 304 allows the control panel to display textual emergency information. The multi-line display is accessible by room occupants using either the scroll up 305 key or scroll down 306 key. Occupants have six reporting keys which include Fire Emergency 307, Rescue Needed 308, Safe (room secure) 309, Security Emergency 310, Medical Emergency 311 and Maintenance Check 312 followed by pressing the Enter Key 313. Each signaling station includes four LED alert lights signifying the current status of the room: 314 Fire Alert (bright red), 315 Evacuate Room (bright green), 316 Security Alert (bright blue); and All Clear (bright white) 317.

FIGS. 10, 11 and 12 illustrate the monitoring screens displayed on the security alarm panel and any other monitoring sites during the active shooter incident. The active threat icon 177 is located near floor level indicator on each screen and was activated by the emergency activation transmitter key fob when the building was first placed into alarm. FIG. 10 represents the ground level floor plan where real-time information beginning at 00:00 and ending at 02:45 (MM:SS) into the incident, during the time when both intruders search the ground floor for victims and then move to the second floor. FIG. 11 continues monitoring the intruders on level 2 by providing real-time emergency information beginning at 03:00 and ending 05:00 (MM:SS) but also contains Friend/Foe information first activated when building entry teams tablet activated the Friend/Foe recognition system.

Using the Active Shooter Timeline table in the foregoing example, the incident begins when active shooters enter the school building using the side D outside door at 00:00 marking the start of the attack. One student leaving the administrative office is shot (00:02) and severely wounded. On hearing the shot, the principal immediately presses the emergency key fob and locks the office door, placing the school building into an active shooter alert. The blue LEDs 316 on the individual room signaling arrays 172 activate and flash. Simultaneously the school audio alarm system 188 sounds the alarm. Immediately students begin moving to their assigned safe rooms. All IP cameras 150 in the building are now available for use by external security officer monitors. Within three seconds of the start of the incident, off-campus police receive the building alarm from the control panel initiated by the principal pressing the emergency key fob. At 00:15 the police dispatch units to the school. Responding units including an incident commander begin using their wireless mobile security computers to monitor the incident at the school in real-time. As students move to safe rooms, the security alarm panel disables individual room motion sensors 125 while resetting all hallway motion sensors 160.

By 00:25, shooters separate and start searching both hallways 115. One shooter moves into the north-south AC hallway while the second shooter moves down the east-west DB hallway. Police on route continually receive sensor status information within three seconds of a sensor state change. Shooters continue down hallways trying to open individual room doors. Safe room hardened door locks 165 in ground floor rooms 101, 102 103, Gym/Cafeteria, Kitchen, Office and Computer Room are all activated once students reach the Safe Room. All emergency signaling stations 172 are activated and report status to the alarm panel and to monitoring police officers. Responding officers watch intruders moving through the AC and BD hallways using hallway motion sensors in various alarm states, i.e. 160 (not in alarm), 162 (recently in alarm) and 168 (currently in alarm) thus providing responding officers with the path intruders take while walking, checking room doors on the ground floor of the building.

Police officers arrive at school building at 03:00. RFID readers 192 co-located with motion sensors will automatically receive emitting signals from security officer transmitters, in this example RFID tags embedded in the building entry team tactical computers, thus enabling the Friend/Foe tracking system. The incident commander determines that the shooters have moved to the second floor and instructs two building entry teams (BET1 and BET2) to maneuver in front and behind the shooters to fix them in between the units. BET officers carrying wireless mobile data computers with RFID tags immediately change motion sensors in vicinity of the building entry teams to blue indicating Friend while officers monitoring the second floor FIGS. 11 & 12 note the security motion sensors (184,186) in the north-south AC corridor turn yellow indicating the precise location of the active shooter intruders.

Police building entry teams move to the second floor to fix the active shooter intruders between the two teams at 03:00 (MM:SS). Motion security sensors 180 turn blue representing Friends recently in alarm and while motion security sensors 182 indicative the relative position of BET1 and BET2 on the second floor closing in on the active shooters in the AC corridor. FIG. 12 is a simplified version of FIG. 11 clearly detailing the Friend (180,182) motion sensors and the Foe (184, 186) motion sensors.

Figure 9:
FIG. 9 shows an exemplary IP video screen viewable through both fixed and mobile monitoring computers wherein the display contains a picture of examples of active shooter intruders, enabling response teams to determine suspect and weapon descriptions and location based on the location of IP camera selected.

Responding security officers and the incident commander utilize the hallway IP cameras to actively monitor the officers' approach to the active shooters. The IP camera 150 located in the second floor north-south hallway AC displays the picture, illustrated in FIG. 9, of the two intruders located outside classroom 202 providing responding officers with suspect description and location. Security motion sensor 186 remains in alarm and yellow indicating the precise location of the intruders while security yellow motion sensors 184 show the recent location of the intruders as recently in alarm.

The fire smoke sensors 128 located in the second floor restroom and the BD hallway go into alarm as smoke spreads out of the restroom. This indicates that the intruders started a fire which is verified by the yellow recently in alarm security motion sensor 184 and digital temperature sensor 148 displaying 99° F. and rising.

The precise location of the two building entry teams on the second floor are illustrated by the blue motion sensors 180 recently in alarm and the blue motion sensors 182 displaying the current location of the two teams of police officers approaching and confronting the intruders. Locating the shooters outside classroom 202, responding officer engage and take down one shooter, while the second shooter surrenders to responding officers. The incident commander changes the AC stairway evacuation signal array 142 and all other floor signal arrays to the exit here signal.

The incident commander declares the ground floor as under control, and authorizes medical treatment for the first victim found outside the ground floor Administrative Office.

The incident ends at 05:00. The incident commander communicates All Clear to police command and control who through their emergency response stations which activates the All Clear LED on the class room signaling stations lighting the White light signal and sending the All Clear text message.

The exemplary embodiments of this invention provide real-time interactive reporting of facility fire/security status information between four basic subsystems over an Internet/Ethernet communications link. The four subsystems are discussed as follows:

(1) Security Alarm Panel

This subsystem directly monitors the status of individual sensors and reports their state to the requesting host, remote and mobile computer subsystems. Embedded data sets can be used to provide host, remote and mobile users with detailed information on the site.

(2) Host Computer

This subsystem, through a communications interface, provides a real-time display of a regional map depicting the location of all the sites within a security network and their status. Other remote subsystems used to remotely monitor the sites can gain access to the security alarm panel for each site through the host computer display page. A local graphic interface provides the host computer operator access to the same detailed information. Communications programs operating within the host maintain real-time status of the sites/alarm points and continually update the display screen.

(3) Remote Computer

This subsystem accesses the communication program within the host computer which displays a map of the area sites and their current status. Using a mouse, a site can be selected to view the details of its status. Upon selection, the remote subsystem can be directly connected via a hyperlink to an embedded communication program within the security alarm panel. Similar to the host computer, the screen updates of site and point status is maintained through a communications program.

(4) Mobile Computer

The mobile computer can gain connectivity to the Ethernet network local to the fire panel through a wireless LAN, once it is within the operating range. "Broadcast packets" (for example, encrypted packets which can be decrypted by the mobile computer) can be sent by the security alarm panel and be used to instruct the mobile computer how to directly access the panel's communication interface through a monitoring station program. Once connected to the security alarm panel, the mobile computer interface may in some alternatives operate like the remote computer. In other alternatives, the mobile computer can only view the evolving emergency.

2. General Communications Overview

Figure 4:
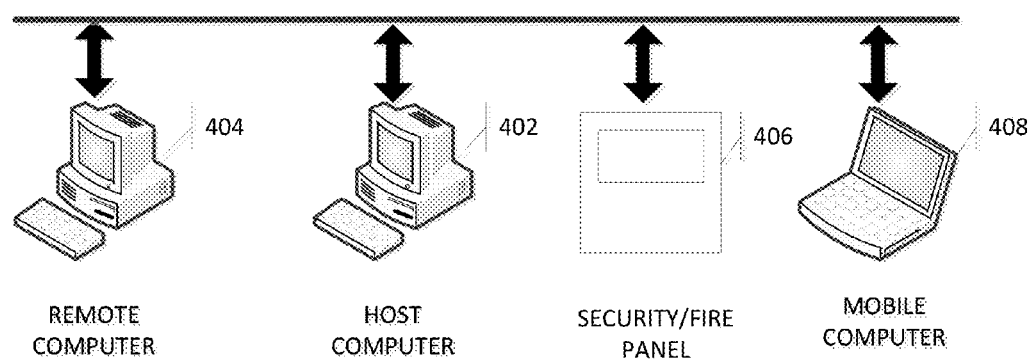
FIG. 4 shows a general overview of communications that occur between four basic subsystems.

Communications between the various subsystems of embodiments of the present invention are disclosed in FIG. 4. Standard network communication tools may be combined with unique graphics and communication programs to effect real-time performance through minimal bandwidth.

FIG. 4 provides a general overview of the communications that transpire between the four basic subsystems of embodiments of the present invention; that is, (1) a host computer 402; (2) a remote computer 404; (3) security alarm panel 406; and (4) mobile computer 408. For example, following a power up indication from the security alarm panel, and a connection by the host's local communication program to the panel's embedded communication program, files regarding site information (such as floor plan) and alarm status information can be sent to the host. Similar protocols can be followed with respect to communications between the remaining subsystems.

Those skilled in the art will appreciate that the information flow represented by the various communications paths illustrated in FIG. 4 are by way of example only, and that communications from any one or more of the four basic subsystems shown in FIG. 4 can be provided with respect to any other one of the four basic groups shown, in any manner desired by the user. Additionally, more or fewer or alternative subsystems may be designed to implement the invention described herein.

Figure 5:
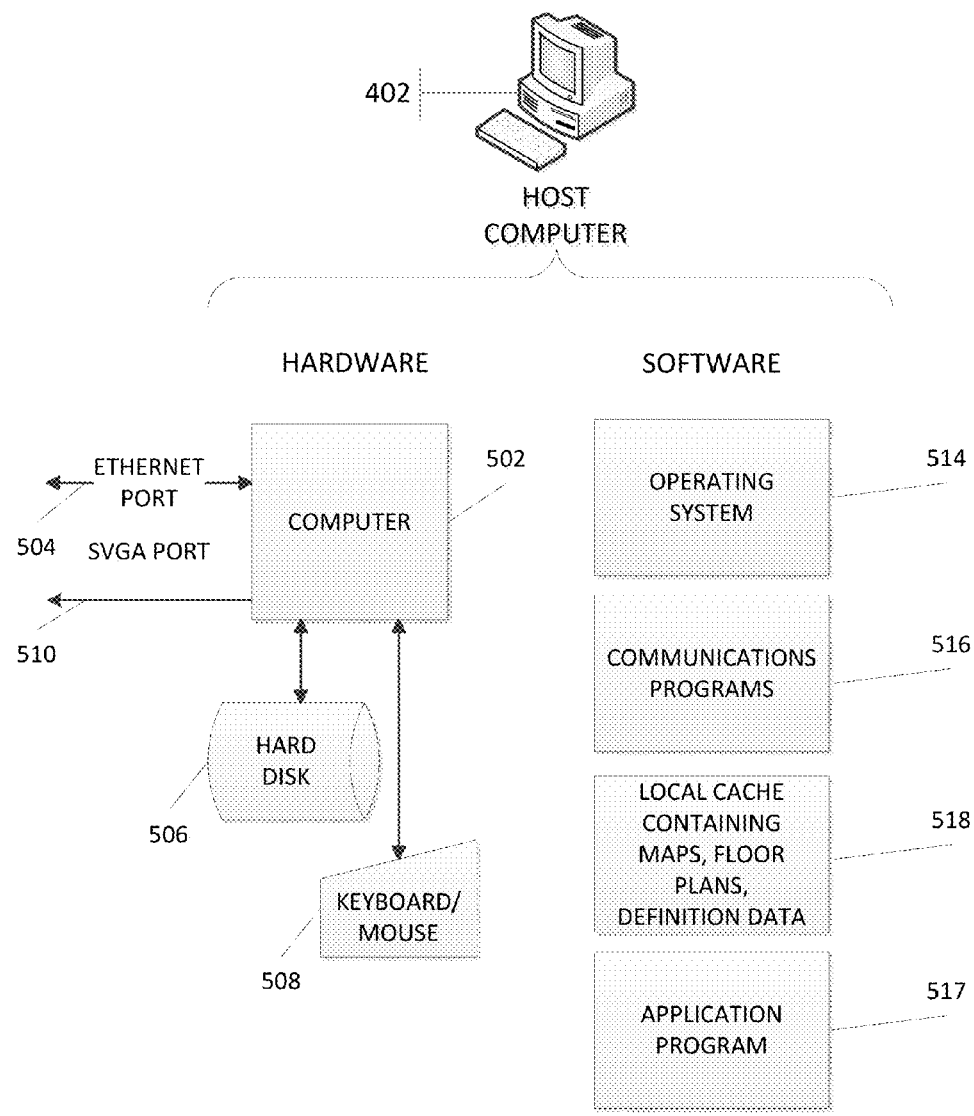
FIG. 5 shows a detailed diagram of an exemplary host computer in a supervisory monitoring system.

FIG. 5 depicts hardware and software components of an exemplary host computer 402. The CPU motherboard 502 for example, (e.g., based on Intel processor or any other processor) is a conventional personal computer that will support any desired network operating system 514, such as any 32-bit operating system including, but not limited to the Microsoft XP Operating System. An exemplary motherboard will feature, or accommodate, Ethernet communications port 504 for interfacing with an Internet or Ethernet network. A hard disk 506 can be installed to support information storage. A keyboard and mouse 508 can be attached for operator interface. A display, such as an SVGA monitor can be attached via an analog or digital video graphics applications port 510 for a visual display unit. The Operating System 514 can be installed in a standard manner, along with the network communication software package 516. An application program 517 is installed. A local cache directory 518 is installed with supporting graphic files (i.e. regional maps), local definition data files, and any other desired information.

b. Remote Computer

Figure 6:
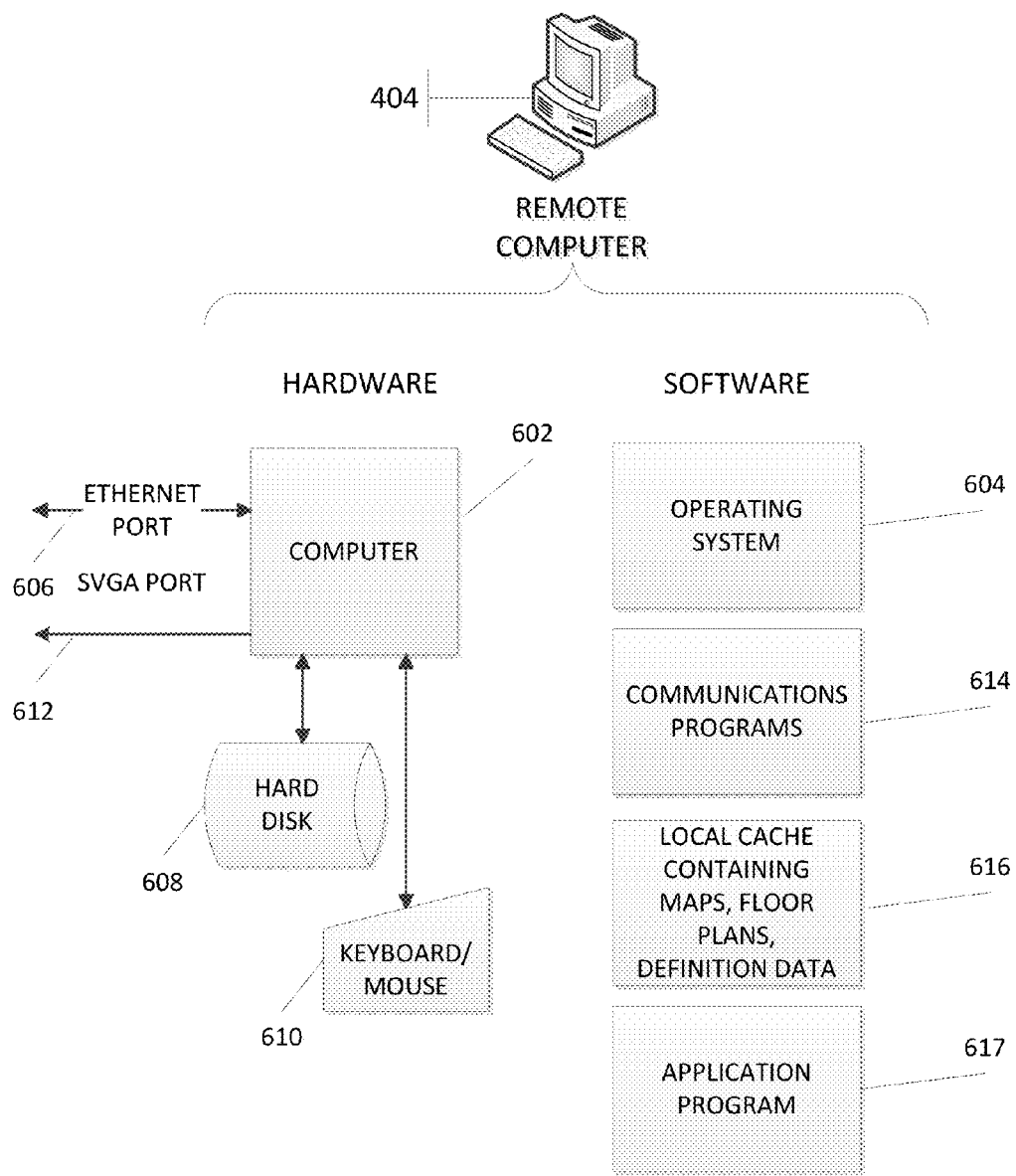
FIG. 6 shows a detailed diagram of an exemplary remote computer.

FIG. 6 depicts hardware and software components of the exemplary outside security computer such as remote computer 404. The CPU motherboard 602 (e.g., based on Intel processor or any other processor) is a conventional personal computer that will support the desired network operating system 604, such as any 32-bit operating system, including but not limited to the Microsoft XP Operating System. The motherboard will feature, or accommodate Ethernet communications 606 with an Internet or Ethernet network via Ethernet port 606. A hard disk 608 will support information storage. A keyboard and mouse 610 will provide operator interface. An SVGA monitor can be attached via port 612 for a visual display unit. The operating system 604 is installed in a standard manner, along with a communication software package 614. An application program 617 is installed. A local cache directory 616 is installed with supporting graphic files (for example, individual room layouts, floor plans, side view of multi-story facility, and so forth), local definition data files, and other local data files.

c. Security Alarm Panel

Figure 7:
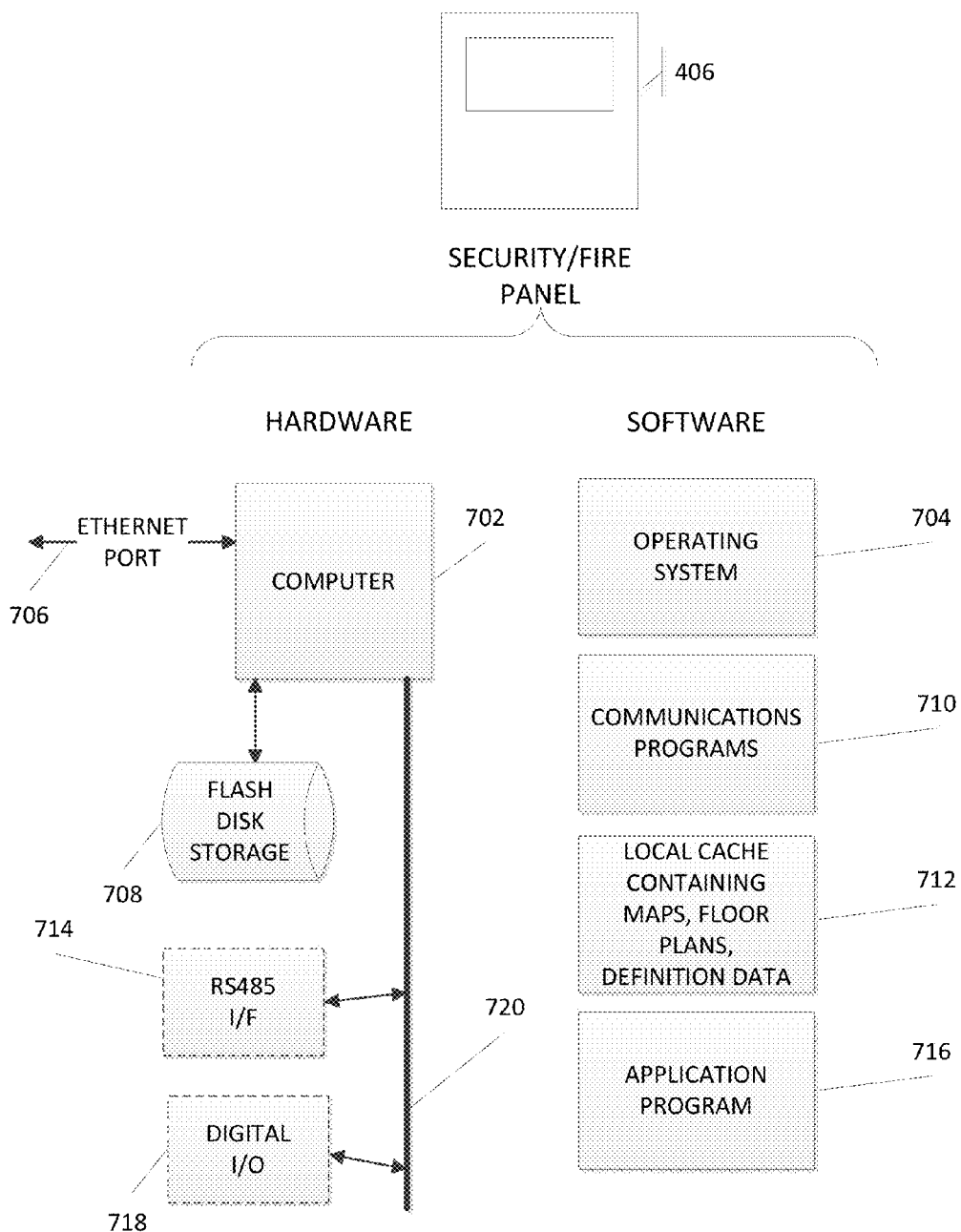
FIG. 7 shows a detailed diagram of an exemplary security/fire alarm panel.

FIG. 7 depicts hardware and software components of the exemplary security alarm panel 407. The CPU motherboard 702 (e.g., based on Intel processor or any other processor) is an embedded computer that will support the desired network operating system 704 such as any embedded 32-bit operating system including, but not limited to the Microsoft embedded XP operating system. The motherboard will feature, or accommodate Ethernet communications with an Internet or Ethernet network via Ethernet port 706. A "flash" disk 708 will support information storage. The operating system can be installed in a standard manner. A communication program 710 is installed. A main application program 712 is also installed, including local data files, and the primary data repository 716 for all graphics and definition files related to the site monitored by this panel. Communications protocols, such as RS485 communications protocols 714, are supported to facilitate communications with the sensors, sensor controller and other access devices. As supporting inputs, direct digital I/O boards 718 can be added to the local bus 720.

d. Mobile Computer

Figure 8:
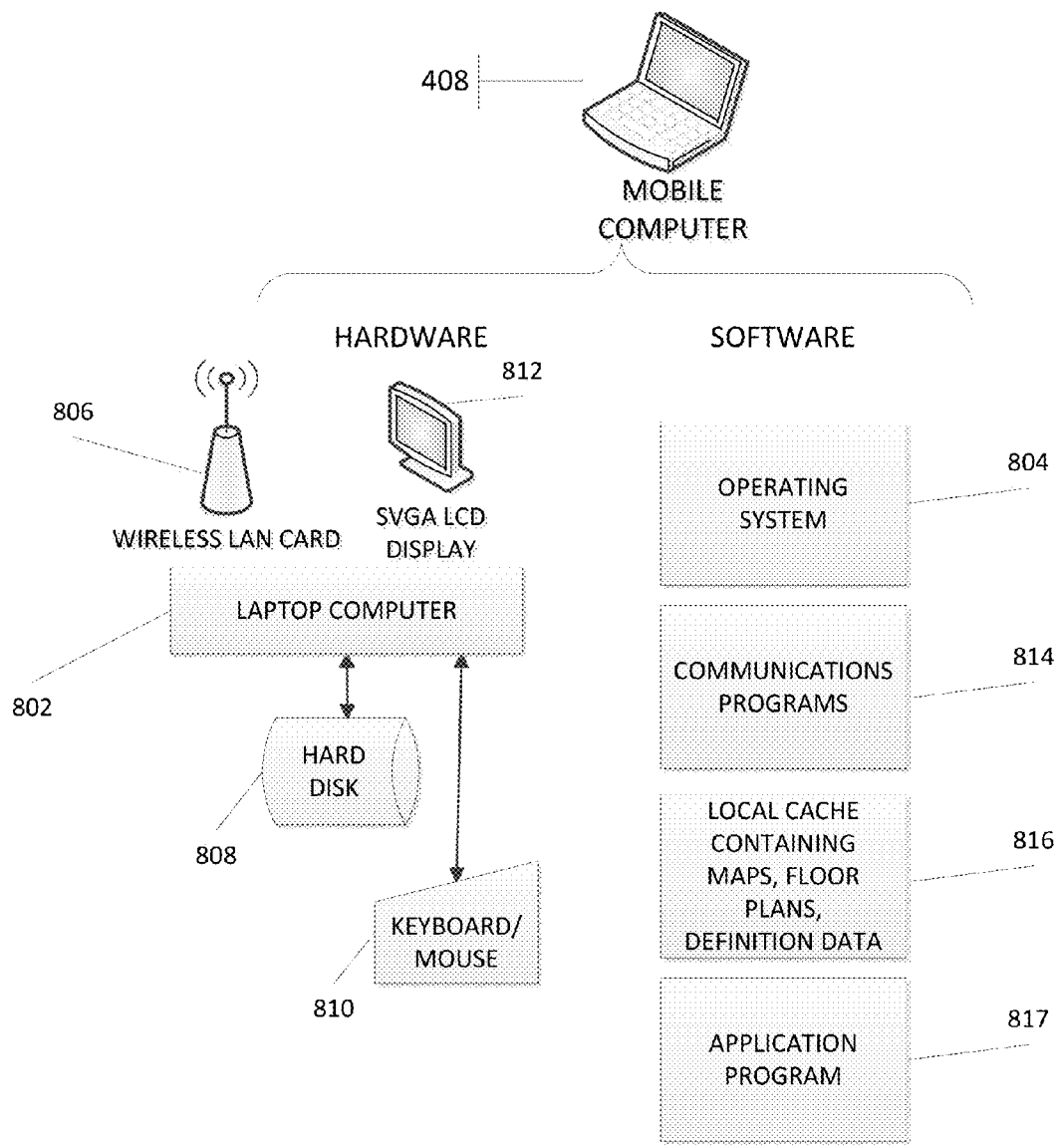
FIG. 8 shows a detailed diagram of an exemplary mobile computer.

FIG. 8 depicts the hardware and software components of a tactical computer such as the exemplary mobile computer 408. The CPU motherboard 802 (e.g., based on Intel processor or any other processor) is a conventional laptop computer or other mobile computing platform that will support the desired network operating system 804, such as any 32-bit operating system including, but not limited to the Microsoft XP Operating System. Add-on boards can be installed to interoperate with, for example, IEEE 802.11 Ethernet communications 806. A hard disk 808 is installed to support information storage. An integral keyboard and mouse 810 are attached for operator interface. A display, such as an SVGA LCD monitor 812 is attached for a visual display unit. The operating system can be installed in a standard manner, along with a communications software package 814 and application software package 817. A local cache directory 816 is installed with supporting graphic files (i.e. individual room layouts, floor plans, side view of multi-story facility, and so forth), local definition data files, and other local data files.

d. Mobile Security Panel Communications

The tactical computer or mobile computer may gain access to the security panel through a wireless local area network, enabled by a wireless LAN hub and/or any available wireless network including, but not limited to existing cellular telephone networks. The mobile computer communication software is executed and seeks to connect to the security alarm panel's embedded communications program. When access is allowed, the remote computer requests that the embedded communication program download the definition data files that define the security panel's display page. The definition data files include a reference to a graphics file. If the current version of the file does not locally exist, the remote computer requests the HTTP transfer of the graphics file from the security panel. Once received from the security panel in response, the graphics file is locally stored (in cache directory) and is displayed. Once the required data is determined to be located on the remote computer, the communications program begins a continuous polling sequence, requesting the status of the various points via a status request. When the communications program receives the response status messages, all the icons overlaying the graphics screen are repainted to indicate the current status of the points.

The security sensors such as RFID readers 190 are installed in the halls collocated with hallway motion detectors. However, in the event that the exit doorways are spaced apart in any substantial length, then the display arrays may be mounted in sequential distances between the various exit doors.

In the examples illustrated, located in each safe room are signaling stations 172. They provide two way communications between safe room occupants and first responders during an emergency. They provide room occupants with status and responding officers with detailed information about the occupant in the room including occupant number and condition.

The evacuation signal arrays 140 may have any number of visual signals programmed to be presented to a person in the building. The amount of information that may be conveyed is limited only by the reasonable visual surface of the array and the complexity of the signal to be communicated. Those signals may include words and/or sound instructions, for instance voice instructions. However, in the active shooter embodiment described herein, the blue LED is used to alert all building occupants that a shooting incident has started. When active, it disables the three different multicolored visual signals.

In still further examples, the signal arrays mounted in one or more of the stairwell, hallway or room locations may include interactive audio abilities. The signal arrays may be activated to give general audio instructions regarding an active shooter event and to seek safe havens and execute lockdown procedures. Different protocols may be used to activate the various audio messages or audio interactions that may be appropriate or needed.

In embodiments of the present invention, alarm information is transmitted to and displayed by a monitoring system including one or more mobile devices, such as tactical computers equipped with wireless communication capabilities, used by security officers/firefighters or hazardous materials or other response personnel as they travel to the space in response to an alarm. As the sensor states change in response to parameter-value changes in the monitored space, these response personnel can receive that information in near real-time, and can develop a strategy, as they travel to the monitored space, for addressing the problem that triggered the alarm. In situations where an alarm requires responses by multiple teams—such as a large fire or chemical fire requiring fire, police, rescue and environmental teams—embodiments of the present invention provide each team with mobile monitoring capabilities displaying the same information, including changes about the alarm situation, in near real-time. An incident commander may take command, for example, to manage the multiple first responder team response. These teams thus have the ability to develop a plan and coordinate their planned actions as they travel to the monitored site, thus improving the timeliness and effectiveness of their response and enhancing their own safety.

In the examples described herein, the Friend(s) and Foe(s) are indicated with blue and yellow icons respectively. Other indicia may be displayed to identify friends and foes and any other persons who may be in a building such as victims and/or unknown persons. The indicia may be different between these different persons by way of color. There could also be different icons displayed, the icons could blink, or there could be other visual differentiators or combinations thereof to be used as the indicia of the respective persons in a building. It is further possible to identify and differentiate between classes of friends and foes if there is more than one. For instance, there could be multiple shades of yellow to differentiate between multiple foes. There could be alpha numeric indicators used alone and/or in connection with the color icons and shapes of icons. The same is possible for identifying foes and other persons in a building.

Also, as described herein, the security officer tactical computer is described as having a security officer transmitter adapted to communicate with the security sensors in a building. Of course, the security officers may individually or collectively as a building entry team carry security officer transmitters separate and apart from the tactical computer that they may or may not have available.

The security officer tactical computer that is described herein is currently expected to be a tablet computer. Other types of computers including laptops, smart phones, and other portable computer devices may alternatively be used by a security officer and contain a security officer transmitter and a display of information including a building floor plan.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A method for monitoring persons during a security incident comprising the steps of:
   providing a plurality of emergency activation transmitters, a plurality of security sensors adapted to receive signals from the emergency activation transmitters, a plurality of video cameras, and a security alarm panel;
   operatively linking the security sensors and video cameras to the security alarm panel;
   installing the security sensors and video cameras in rooms in a building;
   upon activation of an emergency activation transmitter, detecting by a security sensor the activation and sending an alarm to the security alarm panel;
   displaying on the security alarm panel the location of the emergency activation on a building floor plan;
   selecting a video camera proximate the location of the emergency activation and displaying the video feed from the selected camera on the security alarm panel;
   using the video feed from the video camera, identifying a suspect;
   using one or more of the plurality of video cameras to track the location of the suspect and displaying with indicia the suspect location on the building floor plan;
   providing a security officer transmitter adapted to communicate with the security sensors;
   displaying with indicia on the security alarm panel the location in the building of a security officer;
   wherein the indicia display of a suspect is visually different from the indicia display of a security officer.

2. A method for monitoring persons during a security incident as described in claim 1, further comprising the steps of:
   providing an outside security computer operatively linked to the security alarm panel and displaying all of the information from the security alarm panel also on the outside security computer;
   whereby outside security personnel have a visual map of a building floor plan in responding to a security incident.

3. A method for monitoring persons during a security incident as described in claim 1,
   wherein the security alarm panel is located in the building.

4. A method for monitoring persons during a security incident as described in claim 1,
   wherein the security alarm panel is located outside of the building.

5. A method for monitoring persons during a security incident as described in claim 1, further comprising the steps of:
   using one or more of the plurality of video cameras to track the location of a possible victim in the building.

6. A method for monitoring persons during a security incident as described in claim 1, further comprising the steps of:
   providing one or more tactical computers operatively linked to the security alarm panel and adapted to display the building floor plan and location of the suspect;
   the tactical computers further comprising a transmitter that is adapted to send signals to the building security sensors so that anyone monitoring the floor plan will also visually see the location of the tactical computer.

7. A method for monitoring persons during a security incident as described in claim 6,
   wherein the tactical tablet is carried by a security officer and comprises the security officer transmitter; and
   further comprising the step of identifying the suspect and the security officer by location in the building with separate indicia displays on the floor plan, wherein the indicia display representing the suspect is visually different than the indicia display representing the security officer carrying the tactical tablet.

8. A method for monitoring persons during a security incident as described in claim 1, further comprising the steps of:
providing a plurality of motion detectors;
operatively linking the motion detectors to the security alarm panel;
installing the motion detectors in rooms in the building; and
using one or more of the plurality of motion detectors to track the location of persons in the building.

9. A method for monitoring persons during a security incident as described in claim 8, further comprising the step of using one or more of the plurality of motion detectors to track the location of a possible victim in the building.

10. A system to monitor persons in a building during a security incident comprising:
a plurality of emergency activation transmitters, and a plurality of security sensors adapted to receive signals from the emergency activation transmitters;
a plurality of video cameras;
a security alarm panel, wherein the security sensors and video cameras are all operatively linked to the security alarm panel;
wherein the security sensors and video cameras are all adapted to be installed in rooms in a building;
further wherein the security alarm panel is adapted to display a building floor plan including different indicia that designate the relative location of the security sensors and video cameras and further a status of each;
and further comprising a security officer transmitter adapted to communicate with the security sensors;
and the signal from the security officer transmitter is adapted to be displayed on the building floor plan displayed on the security alarm panel; and
wherein the building floor plan comprises indicia adapted to represent a suspect and a security officer, and the indicia for each is visually different from the other.

11. A system to monitor persons in a building during a security incident as described in claim 10, further comprising an outside security computer operatively linked to the security alarm panel and adapted to also display all of the information from the security alarm panel.

12. A system to monitor persons in a building during a security incident as described in claim 10,
wherein the security alarm panel is adapted to be located in the building.

13. A system to monitor persons in a building during a security incident as described in claim 10,
wherein the security alarm panel is adapted to be located outside of the building.

14. A system to monitor persons in a building during a security incident as described in claim 10,
further comprising one or more tactical computers adapted to be operatively linked to the security alarm panel and further adapted to display the building floor plan,
the tactical computer further comprising a transmitter that is adapted to send signals to the building security sensors, whereby the location of the tactical computer is adapted to be shown on the display of the building floor plan.

15. A system to monitor persons in a building during a security incident as described in claim 10,
wherein the emergency activation transmitter is a radio frequency identification transmitter.

16. A system to monitor persons in a building during a security incident as described in claim 10,
wherein the emergency activation transmitter is adapted to be positioned in a fixed location in the building.

17. A system to monitor persons in a building during a security incident as described in claim 10,
wherein the emergency activation transmitter is a portable device.

18. A system to monitor persons in a building during a security incident as described in claim 10, further comprising:
a plurality of motion detectors operatively linked to the security alarm panel and adapted to be installed in rooms in the building, and
further wherein the security alarm panel is adapted to display the building floor plan including different indicia that designate the location of the motion sensors and a status of each.

* * * * *